US012719274B2

(12) United States Patent
Baldassare

(10) Patent No.: US 12,719,274 B2
(45) Date of Patent: Aug. 25, 2026

(54) SYSTEM FOR POWERING A PLURALITY OF IMPLEMENTS

(71) Applicant: GAMOTECH INC., Westmount (CA)

(72) Inventor: Fred Baldassare, Saint-Laurent (CA)

(73) Assignee: GAMOTECH INC., Westmount (CA)

( * ) Notice: Subject to any disclaimer, the term of this patent is extended or adjusted under 35 U.S.C. 154(b) by 350 days.

(21) Appl. No.: 18/573,080

(22) PCT Filed: Jun. 28, 2022

(86) PCT No.: PCT/IB2022/056008
§ 371 (c)(1),
(2) Date: Dec. 21, 2023

(87) PCT Pub. No.: WO2023/275751
PCT Pub. Date: Jan. 5, 2023

(65) Prior Publication Data

US 2024/0291272 A1 Aug. 29, 2024

Related U.S. Application Data

(60) Provisional application No. 63/216,474, filed on Jun. 29, 2021.

(51) Int. Cl.
*H02J 1/14* (2026.01)
*B60R 16/03* (2006.01)
(Continued)

(52) U.S. Cl.
CPC ................ *H02J 1/14* (2013.01); *H02J 7/855* (2026.01); *H02J 2105/30* (2026.01); *H02J 2207/20* (2020.01)

(58) Field of Classification Search
CPC .......... H02J 1/14; H02J 7/855; H02J 2105/30; H02J 2207/20; H02J 1/08; B60R 16/03; H02M 1/008; H02M 1/007
(Continued)

(56) References Cited

U.S. PATENT DOCUMENTS 6,993,421 B2 * 1/2006 Pillar ..................... A62C 27/00 701/34.3
2005/0151374 A1 * 7/2005 Ambrose ............... B23K 9/323 290/1 A
(Continued)

FOREIGN PATENT DOCUMENTS

CA 2975767 A1 2/2019

OTHER PUBLICATIONS

International Search Report from PCT/IB2022/056008, Sep. 27, 2022, Ryan Reynolds.

*Primary Examiner* — Jaime Figueroa
(74) *Attorney, Agent, or Firm* — BCF LLP

(57) ABSTRACT

Systems for powering a plurality of implements including a controller, a battery assembly communicably connected to the controller, a plurality of distribution modules communicably connected to the controller and electrically connected to the battery assembly. The plurality of distribution modules selectively provide power to at least one corresponding implement of the plurality of implements and comprise an electric distribution module that distributes electric power from the battery assembly to at least one electric implement of the implements connected thereto, a hydraulic distribution module that converts electric power from the battery assembly into hydraulic power and distributes said hydraulic power to at least one hydraulic implement of the implements connected thereto, and a pneumatic distribution module that converts electric power from the battery assembly into pneumatic power and distributes said pneumatic power to at least one pneumatic implement of the implements connected thereto.

18 Claims, 7 Drawing Sheets

(51) Int. Cl.
*H02J 7/00* (2026.01)
*H02J 105/30* (2026.01)

(58) Field of Classification Search
USPC .......................................................... 700/286
See application file for complete search history.

(56) References Cited

U.S. PATENT DOCUMENTS

2009/0206612 A1 8/2009 Baldassare
2018/0022340 A1 1/2018 Hill
2018/0056902 A1* 3/2018 Trinkner ................. B66C 23/38
2018/0298731 A1 10/2018 Bishop
2022/0017029 A1* 1/2022 Trinkner ................... H02J 7/00

* cited by examiner

SYSTEM FOR POWERING A PLURALITY OF IMPLEMENTS

CROSS-REFERENCE TO RELATED APPLICATIONS

The present patent application is a national phase entry of International Application No. PCT/IB2022/056008, entitled "System for Powering a Plurality of Implements, filed Jun. 28, 2022, which claims priority from U.S. Provisional Patent Application No. 63/216,474, entitled "Automated Mobile Power System," filed on Jun. 29, 2021, the entirety of both of which is incorporated by reference herein.

FIELD OF THE TECHNOLOGY

The present disclosure generally relates to the field of power delivery and, in particular, to a mobile power system for powering a plurality of implements.

BACKGROUND

Mobile power systems are commonly used in various construction projects to provide power to equipment on remote worksites where power is not readily available. The mobile power systems are typically implemented in a medium or heavy duty truck or other service vehicle that is suitable to reach the worksite. Such mobile power systems, including for instance generators, usually rely on fossil fuels to provide power. In most cases, the mobile power system relies on an engine of the service vehicle to generate power. Often these systems are run continuously to ensure that power is available at all times. However, regulations tend to limit use of fossil fuel-based power systems in hazardous worksites. Local regulations may further limit continuous generator engine operation for noise or disturbance concerns.

Therefore, there remains an interest in a mobile power system that alleviate at least some of these drawbacks.

SUMMARY

Broadly speaking, the present technology provides a system for powering a plurality of implements. In one embodiment described herein, the power system is connected to a trailer assembly configured for being towed to a work or construction site. In some other embodiments, the system is separately constructed and subsequently mounted on a vehicle such as a service vehicle that may carry the system. As such, the system may be referred to as a "mobile power system" herein after. The mobile power system includes a controller, a battery assembly communicably connected to the controller and a plurality of distribution modules communicably connected to the controller and electrically connected to the battery assembly. The mobile power system relies on electric power provided by the battery assembly to power the implements. In this embodiment, the plurality of distribution modules selectively provide power to at least one corresponding implement. More specifically, the mobile power system includes an electric distribution module configured to distribute electric power from the battery assembly to at least one corresponding implement connected thereto, a hydraulic distribution module configured to convert electric power from the battery assembly into hydraulic power and distribute said hydraulic power to at least one corresponding implement connected thereto, and a pneumatic distribution module configured to convert electric power from the battery assembly into pneumatic power and distribute said pneumatic power to at least one corresponding implement connected thereto.

In at least some embodiments, the mobile power system includes an electric motor communicably connected to the controller and powered by the battery assembly, the hydraulic distribution module and the pneumatic distribution module receiving mechanical power from the electric motor. In some embodiments, the electric motor is a double-ended shaft brushless motor having a rotor, rotation of the rotor along a rotation axis causing concurrent actuation of a hydraulic pump of the hydraulic distribution module and a pneumatic compressor of the pneumatic distribution module.

An aspect of the present disclosure is to provide a mobile power system for powering a plurality of implements, the mobile power system including a controller, a battery assembly communicably connected to the controller and a plurality of distribution modules communicably connected to the controller and electrically connected to the battery assembly, the plurality of distribution modules being configured to selectively provide power to at least one corresponding implement of the plurality of implements. The plurality of distribution modules including an electric distribution module configured to distribute electric power from the battery assembly to at least one electric implement of the plurality of implements connected thereto, a hydraulic distribution module configured to convert electric power from the battery assembly into hydraulic power and distribute said hydraulic power to at least one hydraulic implement of the plurality of implements connected thereto and a pneumatic distribution module configured to convert electric power from the battery assembly into pneumatic power and distribute said pneumatic power to at least one pneumatic implement of the plurality of implements connected thereto.

In some embodiments of the present technology, the system further includes an electric motor communicably connected to the controller and powered by the battery assembly, at least one of the distribution modules using the electric motor to convert the received electric power.

In some embodiments of the present technology, the hydraulic distribution module and the pneumatic distribution module receive mechanical power from the electric motor.

In some embodiments of the present technology, the hydraulic distribution module includes a hydraulic pump operatively connected to the electric motor, the hydraulic pump is configured to receive mechanical power from the electric motor during operation, the pneumatic distribution module includes a pneumatic compressor operatively connected to the electric motor, the pneumatic compressor is configured to receive mechanical power from the electric motor during operation.

In some embodiments of the present technology, the electric motor is a double-ended shaft brushless motor including a rotor, rotation of the rotor along a rotation axis causing concurrent actuation of the hydraulic pump and the pneumatic compressor.

In some embodiments of the present technology, the battery assembly is a DC battery assembly configured to generate a DC electric current, the mobile power system includes a DC-AC power inverter electrically connected to the battery assembly, and the electric motor is a tri-phase electric motor receiving tri-phase electric power from the DC-AC inverter.

In some embodiments of the present technology, the controller is electrically powered by the battery assembly.

In some embodiments of the present technology, the mobile power system is mounted on a service vehicle.

In some embodiments of the present technology, the service vehicle includes one of a construction truck, an autonomous mobile robot, a service trailer, a van, a medium duty truck, a heavy duty truck and a pick-up truck.

In some embodiments of the present technology, the service vehicle is an electric service vehicle including a vehicle operation-dedicated battery and the mobile power system further includes an adapting device configured to provide electric power from the vehicle operation-dedicated battery to the plurality of distribution modules such that the plurality of distribution modules receives electric power from the vehicle operation-dedicated battery.

In some embodiments of the present technology, each distribution module includes at least one power outlet for connecting the corresponding at least one implement, and the mobile power system further includes at least one load sensor communicably connected to the controller and respectively disposed at the at least one power outlet to detect presence of one implement connected at said power outlet.

In some embodiments of the present technology, the controller is configured to adapt a transfer of electric power from the battery assembly to the plurality of distribution modules based on data provided by the at least one load sensors.

In some embodiments of the present technology, the load sensors sense power consumption at each power outlet and generate data including information about said power consumption, and the data is stored in a memory communicably connected to the controller.

In some embodiments of the present technology, the at least one load sensor is a plurality of load sensors, the plurality of load sensors being disposed at each of the at least one power outlet, and the controller, in response to the plurality of load sensors indicating that no implement is connected to the at least one power outlet, triggers a counter indicative of an amount of time that has passed since the detection that no implement is connected to the power outlets and disconnects, in response to the counter reaching a pre-determined value, the battery assembly from the plurality of distribution modules.

In some embodiments of the present technology, the at least one load sensor is a plurality of load sensors, the plurality of load sensors being disposed at each of the at least one power outlet, and the controller, in response to the plurality of load sensors indicating that no implement is connected to the at least one power outlet or that implements connected to the at least one power outlet are not currently used, triggers a counter indicative of an amount of time that has passed since the detection that no implement is connected to the power outlets or that implements connected to the at least one power outlet are not currently used, and causes, in response to the counter reaching a pre-determined value, the battery assembly to enter a standby mode.

In some embodiments of the present technology, the at least one load sensor is a plurality of load sensors, the plurality of load sensors being disposed at each of the at least one power outlet. The controller causes the battery assembly to enter a standby mode, in response to at least one of the plurality of load sensors indicating that no implement is connected to the at least one power outlet, and at least one of the plurality of implements connected to the at least one power outlet is not currently used.

In some embodiments of the present technology, the mobile power system further includes an electric motor communicably connected to the controller and powered by the battery assembly, the hydraulic distribution module and the pneumatic distribution module receiving mechanical power from the electric motor, the controller being further configured to, in order to cause the battery assembly to enter a standby mode, cause the electric motor to stop.

In some embodiments of the present technology, the battery assembly is a first battery assembly, the electric motor is a first electric motor, and the plurality of distribution modules is a plurality of first distribution modules, and the mobile power system further includes a second battery assembly communicably connected to the controller; and a plurality of second distribution modules communicably connected to the controller and electrically connected to the second battery assembly, the plurality of second distribution modules being configured to selectively provide power to at least one second corresponding implement of the plurality of implements. The plurality of second distribution modules includes a second electric distribution module configured to distribute electric power from the second battery assembly to at least one corresponding implement connected thereto, a second hydraulic distribution module configured to convert electric power from the second battery assembly into hydraulic power and distribute said hydraulic power to at least one corresponding implement connected thereto and a second pneumatic distribution module configured to convert electric power from the second battery assembly into pneumatic power and distribute said pneumatic power to at least one corresponding implement connected thereto.

In some embodiments of the present technology, the controller is configured to direct electric power form the second battery assembly to the plurality of first distribution modules.

In some embodiments of the present technology, the battery assembly includes a battery bank and a charging device.

In some embodiments of the present technology, the battery bank is a Lithium-Ion battery bank.

In some embodiments of the present technology, the electric distribution module includes at least one converter to provide electric power to at least one corresponding implement connected thereto with at least one corresponding voltage values.

In some embodiments of the present technology, the hydraulic distribution module and the pneumatic distribution module are housed in a same mechanical distribution module; and the mechanical distribution module includes an acoustic and heat insulated housing.

In some embodiments of the present technology, the electric distribution module includes a first power outlet for delivery of DC electric current, a second power outlet for delivery of 240V AC electric current and a third power outlet for delivery of 120V AC electric current.

In some embodiments of the present technology, the first power outlet includes a first DC power outlet for delivery of 12V DC electric current, a second DC power outlet for delivery of 24V DC electric current and a third DC power outlet for delivery of 48V DC electric current.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Various representative embodiments of the described technology will be described more fully hereinafter with reference to the accompanying drawings, in which representative embodiments are shown. The present technology concept may, however, be embodied in many different forms and should not be construed as limited to the representative embodiments set forth herein. Rather, these representative embodiments are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "controller", "processor" or "processing unit", may be provided through the use of dedicated hardware as well as hardware capable of executing software in association with appropriate software and according to the methods described herein. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown, the hardware being adapted to (made to, designed to, or configured to) execute the modules. Moreover, it should be understood that module may include for example, but without being limitative, computer program logic, computer program instructions, software, stack, firmware, hardware circuitry or a combination thereof which provides the required capabilities.

Additional and/or alternative features, aspects, and advantages of embodiments of the present technology will become apparent from the following description, the accompanying drawings and the appended claims.

BRIEF DESCRIPTION OF THE FIGURES

The features and advantages of the present disclosure will become apparent from the following detailed description, taken in combination with the appended drawings, in which.

Figure 1:
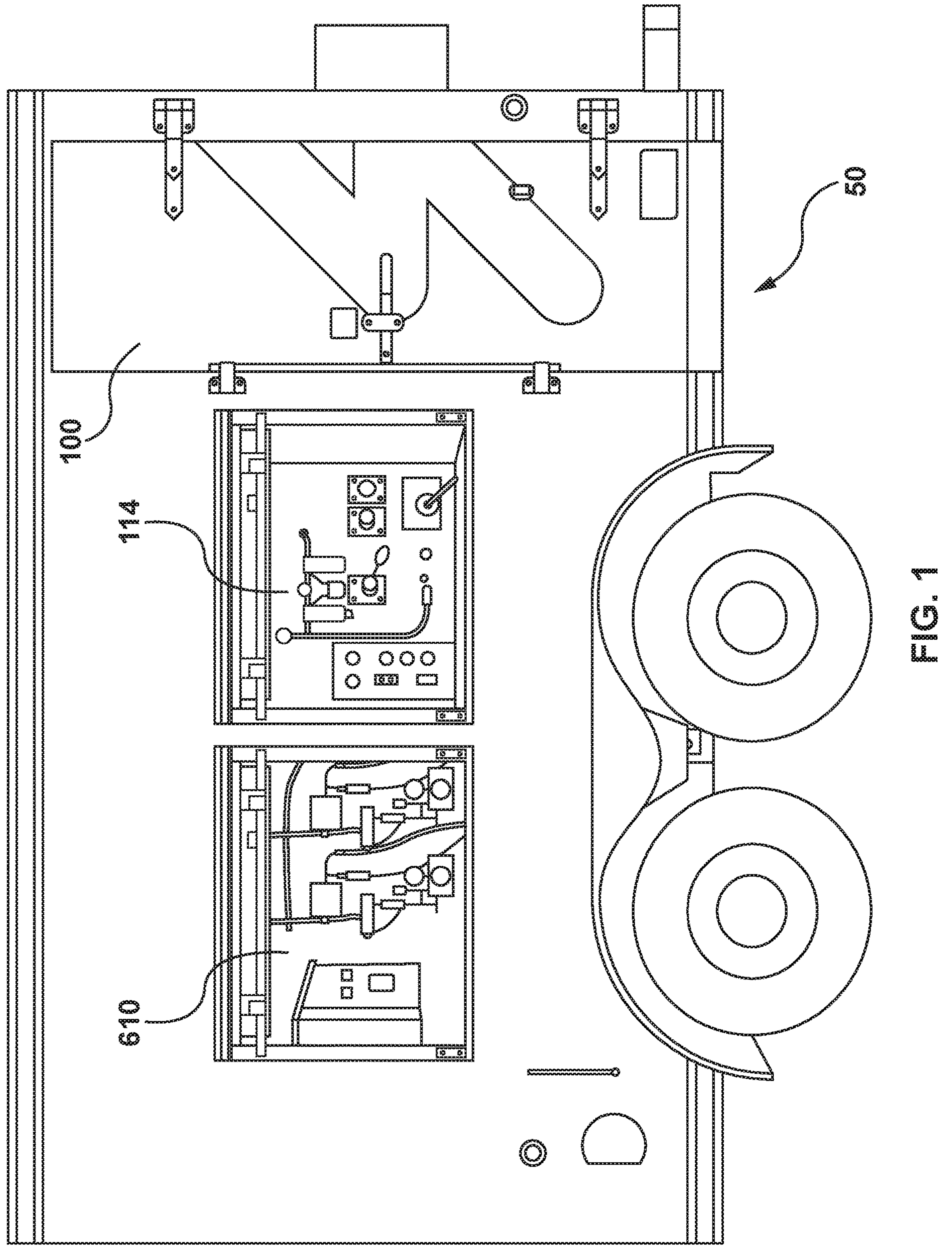
FIG. 1 a picture of a trailer on which a mobile power system is mounted in accordance with some embodiments of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims. It should be noted that, unless otherwise explicitly specified herein, the drawings are not necessarily to scale.

DETAILED DESCRIPTION

Figure 2:
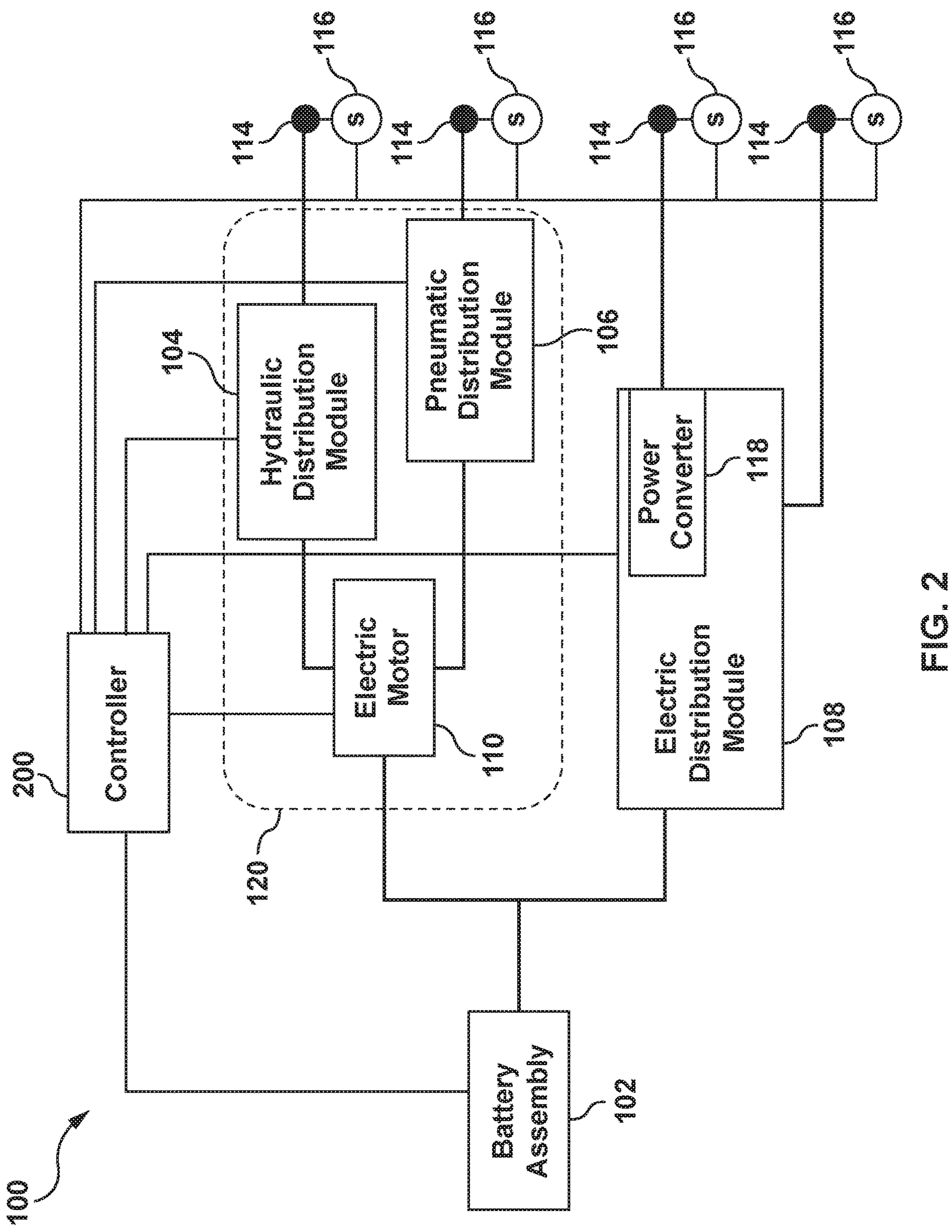
FIG. 2 is a block-diagram of the mobile power system of FIG. 1.

Referring to FIGS. 1 and 2, there is shown a mobile power system 100 in accordance with non-limiting embodiments of the present technology. As best shown on FIG. 1, the mobile power system 100 is mounted on a trailer 50 such that the mobile power system 100 may be easily carried to a desired location (e.g. a worksite). As such, the mobile power system 100 mounted on the trailer 50 may be used to provide and distribute power to a plurality of implements in remote locations. In at least some embodiments, it is contemplated that the system 100 could be differently configured for mobility.

For example, the system 100 could be arranged in a generally compact cube, configured to be loaded onto a flat bed and delivered to a work site. The mobile power system 100 could be housed in a housing made of aluminium insulating material to lower a noise level produced by components thereof. It is also contemplated that the system 100 could be connected to a vehicle, as will be described in more detail below.

FIG. 2 is a schematic diagram of a mobile power system 100 in accordance with non-limiting embodiments of the present technology. It is to be expressly understood that the mobile power system 100 as depicted is merely an illustrative implementation of the present technology. In some cases, what is believed to be helpful examples of modifications to the mobile power system 100 may also be set forth below.

Generally speaking, the mobile power system 100 is configured to provide power to a plurality of implements, also referred to as tools, equipment, construction equipment, or the like. To do so, the mobile power system 100 includes a battery assembly 102 for storing and distributing electric power. The battery assembly 102 and components thereof will be described in more detail below. Power is distributed, either directly as electric power or following conversion (described further below), through a plurality of power outlets 114 of the mobile power system 100. Implements may be further connected to (e.g. plugged into) the power outlets 114 to receive power from the mobile power system 100. The implements may be, for example and without limitations, drills, generators, saws, hydraulic power packs, water pumps, sanders, electric impact wrenches, pole drivers, extractors, and electric water trash pumps.

The mobile power system 100 includes an electric distribution module 108 receiving electric power from the battery assembly 102 and distributing electric power to one or more associated power outlets 114. The mobile power system 100 also includes a hydraulic distribution module 104 indirectly powered by the battery assembly 102 and distributing hydraulic power to one or more associated power outlets 114. The mobile power system 100 further includes a pneumatic distribution module 106 indirectly powered by the battery assembly 102 and distributing pneumatic power to one or more associated power outlets 114.

The mobile power system 100 also includes an electric motor 110 receiving electric power from the battery assembly 102 to provide mechanical energy to the hydraulic distribution module 104 and the pneumatic distribution module 106. As such, the combination of the hydraulic distribution module 104, the pneumatic distribution module 106 and the electric motor 110 may be referred to as a mechanical distribution module 120.

Figure 6:
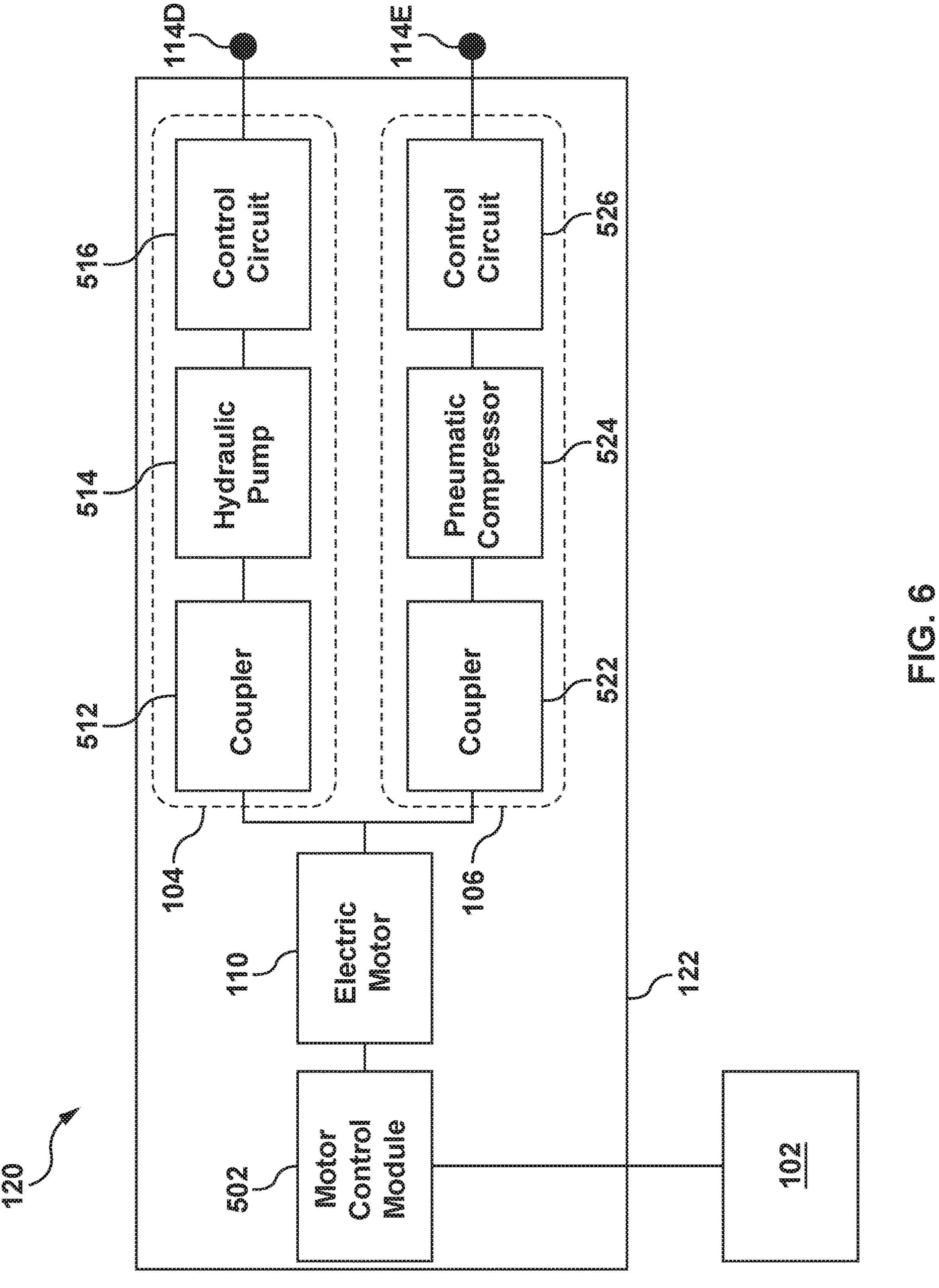
FIG. 6 is a block diagram of a mechanical distribution module of the mobile power system of FIG. 1 in accordance with an embodiment of the present technology.

With additional reference to FIG. 6, the hydraulic distribution module 104 includes a coupler 512, a hydraulic pump 514 and a control circuit 516. The hydraulic pump 514 may be of any particular desired type suitable for the desired application. The hydraulic pump 514 may be, for example, a radial-flow centrifugal pump. In use, the coupler 512 mechanically couples the hydraulic pump 514 to the electric motor 110 such that the hydraulic pump 514 provides a desired hydraulic power to corresponding power outlets 114. In this embodiment, the hydraulic pump 514 is a dual hydraulic pump providing hydraulic power toward two distinct power outlets 114. More specifically, a shaft (not shown) receives mechanical power the electric motor 110 and distributes power to two hydraulic pumps connected thereto. Embodiments where more than two hydraulic pumps are connected to a same shaft (e.g. a triple hydraulic pump) are also contemplated. In at least some embodiments, the hydraulic pump 514 is a gear pump, variable displacement hydraulic pump, vane pump or any other type of hydraulic pump suitable for being implemented in the hydraulic distribution module 104.

With continued reference to FIG. 6, the pneumatic distribution module 106 includes a coupler 522, a pneumatic compressor 524 and a control circuit 526. The pneumatic compressor 524 may be of any particular desired type suitable for the purpose of compressing a compressible fluid. The pneumatic compressor 524 may be implemented, for example, by dual rotary screw air compressors. In this embodiment, the pneumatic compressor 524 generates about 65 Cubic Feet per Minute (CFM) at 175 Pound-Force per Square Inch (PSI). Additionally, in some embodiments, the pneumatic distribution module 106 includes a second pneumatic compressor 524 generating about 85 CFM at 175 PSI. In this embodiment, the pneumatic compressor 524 is a Vehicle Mounted Ai Compressor (VMAC) VR70 compressor. Alternative embodiments where the pneumatic compressor 524 is a rotary or twin screw compressor, a reciprocating compressor, a centrifugal compressor, or any other type of pneumatic compressor suitable for being implemented in the pneumatic distribution module 104 are also contemplated.

In at least some embodiments, the mobile power system 100 further includes load sensors 116 disposed at the power outlets 114. As will be described in greater detail herein below, the load sensors 116 may be part of the control circuits 516, 526 in the mechanical distribution module 120. The load sensors 116 are configured to sense power consumption at each power outlet 114 and generate data including information about power consumption of the corresponding outlet 114. Generally, the load sensors 116 detect the presence of an implement connected to the corresponding power outlet 114, allowing for selective activation of the corresponding outlet 114. It should be understood that operations of the load sensors 116 are not limited to electric implements. For instance, a load sensor 116 disposed at a power outlet 114 of the hydraulic distribution module 104 may detect presence of an implement connected thereto (e.g. a hose of the implement) receiving hydraulic power from the hydraulic distribution module 104 and generate information about a hydraulic power consumption thereof. Said information may be, for example, indication of a flow rate of a liquid used by the implements in gallons per minute (GPM).

The mobile power system 100 also includes a controller 200 configured to orchestrate, manage, and/or monitor operations of the mobile power system 100. Components of the controller 200 are described in more detail below. The controller 200 is communicably connected to the battery assembly 102, the electric distribution module 108, the hydraulic distribution module 104, the pneumatic distribution module 106, the electric motor 110 (and/or a controller thereof) and the load sensors 116. Returning to FIG. 1, the mobile power system 100 further includes a control interface 610 communicably connected to the controller 200. More specifically, the control interface 610 may include a human-machine interface (HMI) communicably connected to the controller 200 and configured to provide information about current or past operational status of the mobile power system 100. As such, a user of the mobile power system 100 may use the control module 610 to be provided with information about the mobile power system 100. The control interface 610 is accessible from an exterior of the trailer 50 through doors, panels, or shutters that may be selectively open or closed. Such doors, panels or shutters may be omitted in alternative embodiments. Embodiments where the control interface 610 is located in an interior of the trailer 50 are also contemplated.

In this embodiment, the controller 200 adapts a transfer of electric power from the battery assembly 102 to the distribution modules 104, 106 and 108 based on data provided by the load sensors 116. For example, in response to the load sensors 116 indicating that no implements are connected to the power outlets 114, or that the implements connected to the power outlets 114 are not currently used (e.g. based on data provided by the corresponding load sensors 116), the controller 200 may cause the battery assembly 102 to enter a "sleep mode" or "standby" mode. In one embodiment, in response to the load sensors 116 indicating that no implement is connected to the power outlets 114 or that implements connected to the power outlets 114 are not currently used, the controller 200 triggers a counter indicative of an amount of time that has passed since the detection that no implement is connected to the power outlets 114, and causes the battery assembly 201 to enter the standby mode in response to the counter reaching a pre-determined value. To do so, the controller 200 communicates with a motor control module 502 (see FIG. 6) to stop the motor 110. Alternatively, the controller may disconnect, in response to the counter reaching a pre-determined value, the battery assembly 120 from the distribution modules 104, 106 and 108. Electric power distribution and lifespan of the battery assembly may thus be optimized given that electric energy is drawn from the battery assembly 102 only when there is a demand for electric power from one or more implements connected to the mobile power system 100. In some embodiments, the counter is omitted or the pre-determined value is set to zero.

The controller 200 is further configured to adjust power distribution from the battery assembly 102 to the distribution modules 104, 106 and 108 based on a number of implements connected to the distribution modules 104, 106 and 108, determined based on information provided by the load sensors 116. As such, it can be said the electric power is dynamically allocated by the controller 200 to the distribution modules 104, 106 and 108 based on information provided by the load sensors 116.

Figure 3:
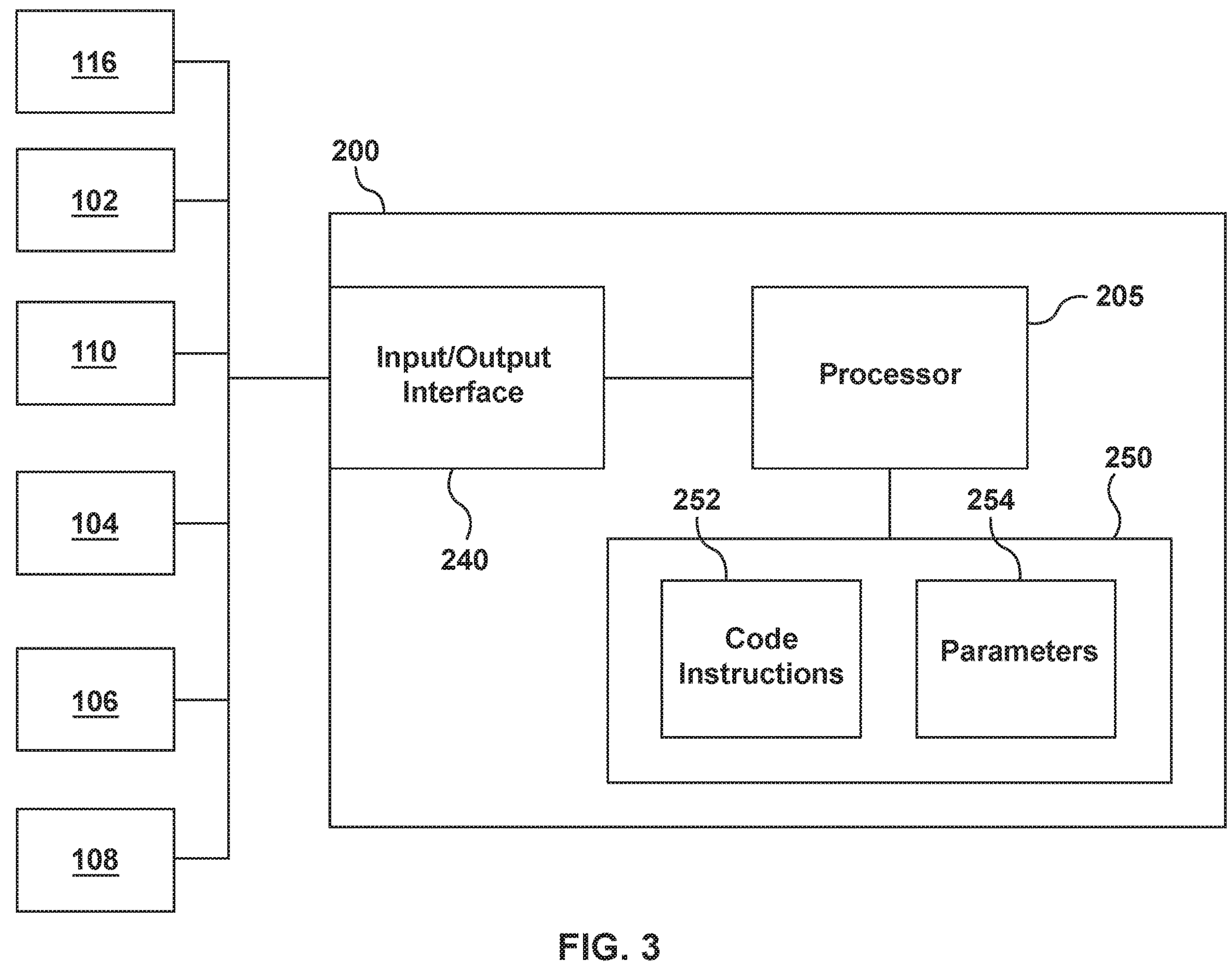
FIG. 3 is a block diagram of a controller of the mobile power system of FIG. 1 in accordance with an embodiment of the present technology.

Illustrated in FIG. 3 is a schematic block diagram of the controller 200 of the mobile power system 100 according to an embodiment of the present technology. The controller 200 includes a processor or a plurality of cooperating processors (represented as a processor 205 for simplicity), a memory device or a plurality of memory devices (represented as a memory device 250 for simplicity), and a input/output interface 240 allowing the controller 200 to communicate with other components of the mobile power system 100 and/or other components in remote communication with the mobile power system 100. For example, the mobile power system 100 may include a networking device to receive instructions from a remote operator and/or retrieve and upload information from a server via, for example, the Internet. The processor 205 is operatively connected to the memory device 250 and to the input/output interface 240. The memory device 250 includes a storage for storing parameters 254, including for example and without limitation the above-mentioned dynamic allocation of electric power of the battery assembly 102 according to a number of implements connected to each of the distribution modules 104, 106 and 108. The memory device 250 includes a non-transitory computer-readable medium for storing code instructions 252 that are executable by the processor 205 to allow the controller 200 to perform the various tasks allocated to the controller 200.

The controller 200 is operatively connected, via the input/output interface 240, to the distribution modules 104, 106 and 108, the battery assembly 102, the electric motor 110 (and/or a controller thereof) and the load sensors 116. The controller 200 executes the code instructions 252 stored in the memory device 250 to implement the various above-described functions that may be present in a particular embodiment.

Figure 4:
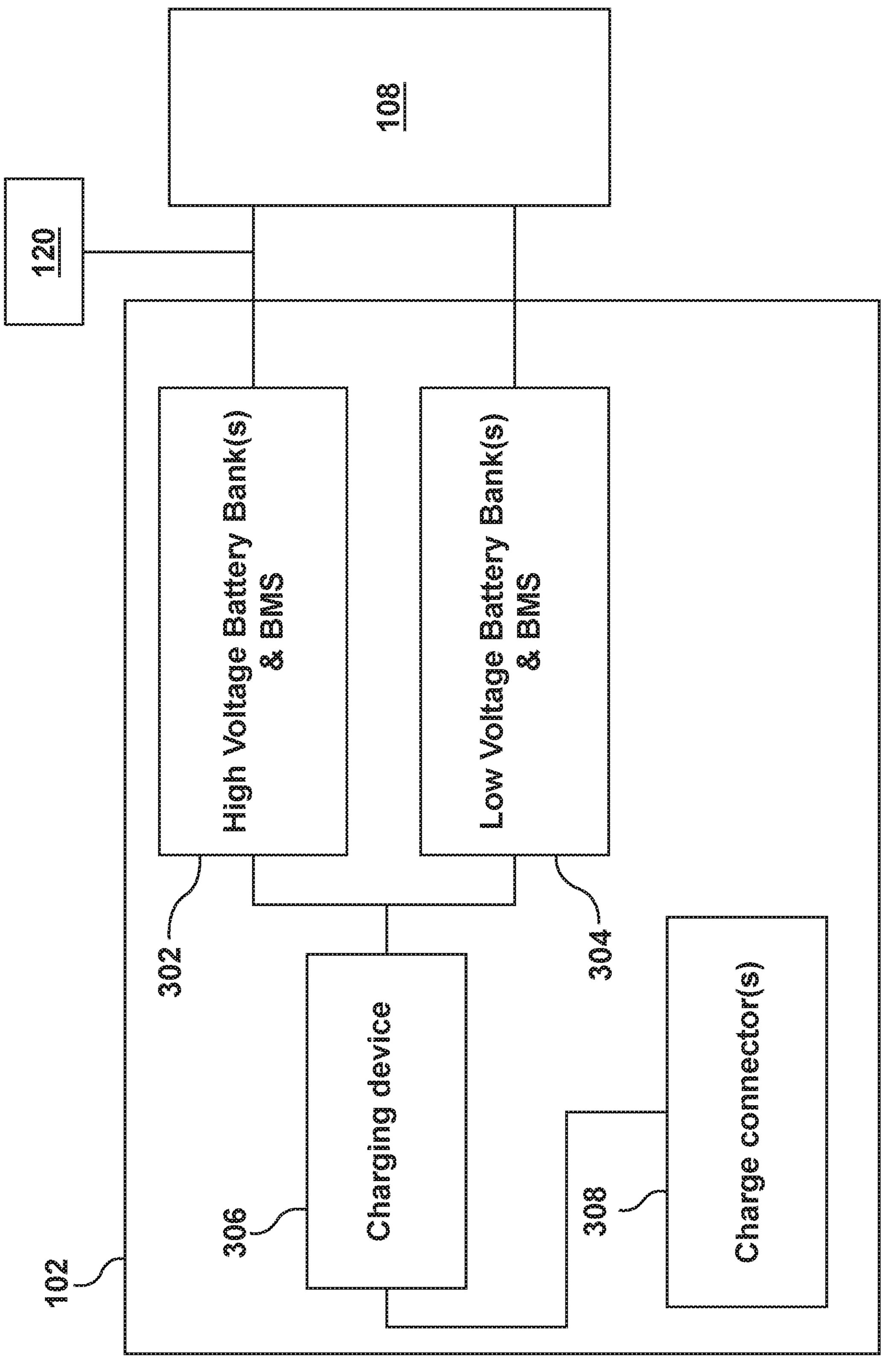
FIG. 4 is a block diagram of a battery assembly of the mobile power system of FIG. 1 in accordance with an embodiment of the present technology.

With reference to FIG. 4, the battery assembly 102 includes a high-voltage battery bank 302 which is, in this embodiment, a 32.5 kWh Lithium-Ion battery bank generating a 144V DC electric power. The battery assembly 102 may rely on Nick-Manganese-Cobalt (NMC) battery chemistry, LiFePO4 battery chemistry, or any other suitable battery chemistry. A battery format of the electrochemical cells of the battery assembly 102 may be, for example and without limitation, pouch, cylindrical or prismatic. This aspect is not limitative. It is contemplated that details of the battery bank 302, including but not limited to the material composition and storage capacity, could vary depending on the embodiment. The battery assembly 102 further includes low-voltage battery bank 304 which is, in this embodiment, a 7.5 kWh battery bank generating 12/24V DC electric power. In some cases, the low-voltage battery bank 304 could be omitted or vary in capacity or output configuration. In some embodiments, the battery assembly 102 could include additional battery banks to increase an autonomy of the mobile power system 100 and/or for redundancy purposes. The battery banks 302, 304 are equipped with a Battery Management system (BMS) (not shown) electrically connected to the mechanical distribution module 120 and the electric distribution module 108 for providing electric power thereto. The BMS may, for example and without limitations, monitor the corresponding battery banks, provide battery protection thereto (i.e. electric insulation), generate data including information about an operational state of the corresponding battery banks and transmit said data to the controller 200.

The battery assembly 102 also includes a charging device 306 for charging the battery banks. In the same or other embodiments, the charging device 306 is an induction-based charging device connected to a charge connector 308 configured for wireless charging of the battery banks. In some other embodiments, the charge connector 308 is a SAE J1772 (IEC 62196 Type 1) connector (i.e. a "J plug").

In some embodiments, the battery assembly 102 could further include a heating plate to provide heat in response to an operating and/or starting temperature of the battery assembly 102 being below a first threshold (e.g. the mobile power system 100 operating in a cold climate or conditions). It is also contemplated that the battery assembly 102 could alternatively or additionally include a cooling system to provide cooling capacity in response to an operating and/or starting temperature of the battery assembly 102 being above a second threshold (e.g. the mobile power system 100 operating in a hot climate or conditions) or for fast charging In the illustrative embodiment of FIG. 2, the electric distribution module 108 provides electric power to two power outlets 114. The electric distribution module 108 includes one or more electric power converters (represented as a converter 118 for simplicity) to convert power received from the battery assembly 102 before distributing electric power to the one or more power outlets 114 of the electric distribution module 108, each converter corresponding to one power outlet of the electric distribution module 108. For example and without limitations, the electric distribution module 108 includes, in this embodiment, power inverters for generating 120V and/or 240V electric power at the corresponding power outlets.

Figure 5:
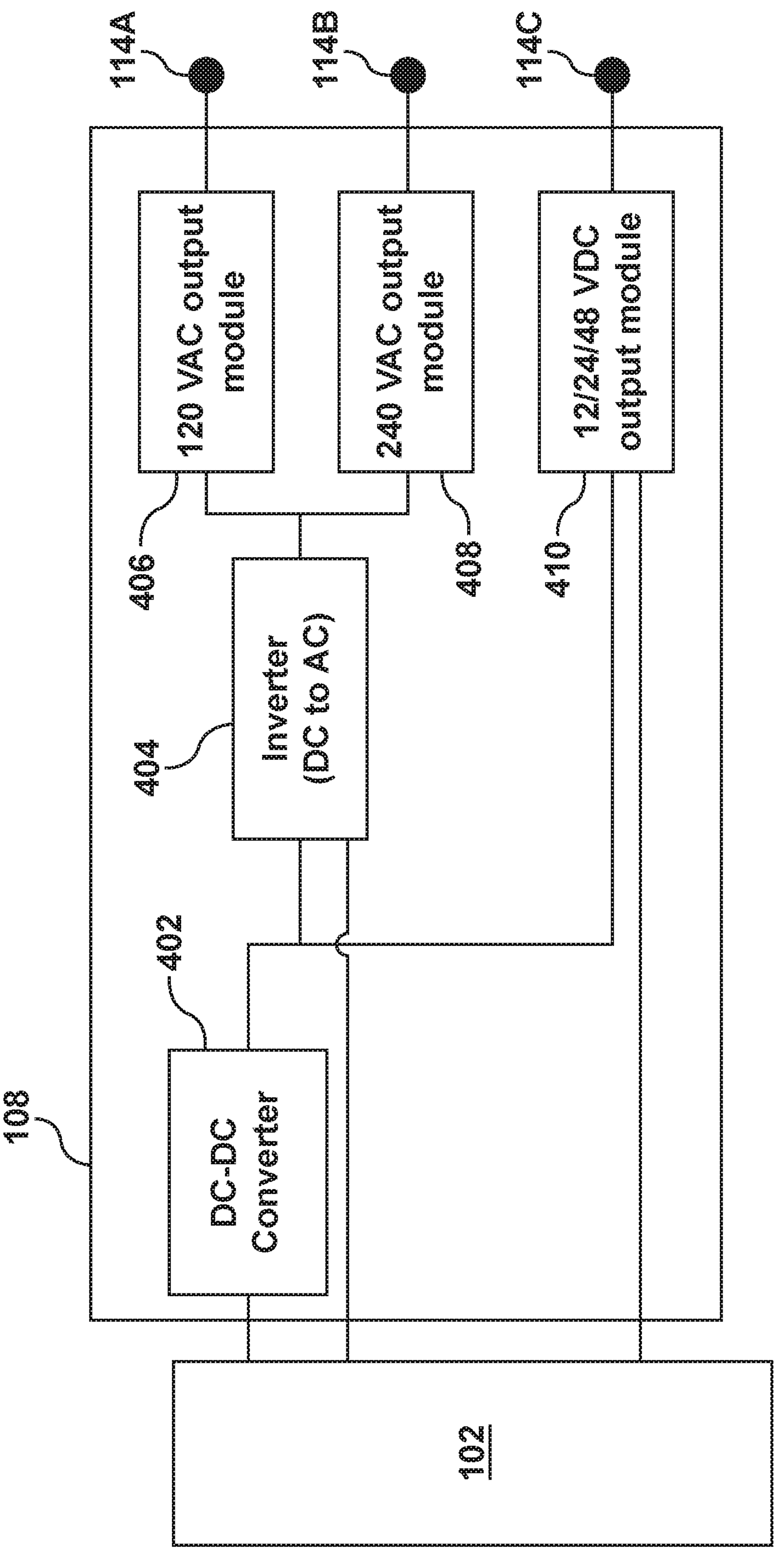
FIG. 5 is a block diagram of an electric distribution module of the mobile power system of FIG. 1 in accordance with an embodiment of the present technology.

With reference to FIG. 5, the electric distribution module 108 includes a DC-DC converter 402 receiving electric power from the high-voltage battery bank 302 of the battery assembly 102 for providing DC power output for lower voltage implements. In some embodiments, the electric power of the high-voltage battery bank 302 is directly received by a power inverter 404 converting electric power from DC to AC. Electric AC power is further directed to a first output module 406 and a second output module 408. The first output module 406 converts the electric power received from the power inverter 404 in a 120V AC electric power and distributes said power to a power outlet 114A. In some embodiments, the first output module 406 could distribute power to multiple power outlets 114A. The second output module 406 convert the electric power received from the power inverter 404 in a 240V AC electric power and distribute said power a power outlet 114B. In some embodiments, the second output module 408 could distribute power to multiple power outlets 114B.

In this embodiment, electric distribution module 108 further includes a third output modules 410 receiving electric power directly from the high-voltage battery bank 302 of the battery assembly 102 or through the DC-DC converter 402. Additionally or optionally, the electric distribution module 108 receives electric power from the low-voltage battery bank 304 of the battery assembly 102. In this embodiment, the third output module 410 generates 12V, 24V and/or 48V DC electric power from the received electric power and distributes the generated power to a power outlet 114C. In some embodiments, the third output module 410 could distribute power to multiple power outlets 114C. More specifically, the third output module 410 distributes 12V DC electric current to at least one power outlet 114C, 24V DC electric current to at least one other power outlet 114C and 48V DC electric current to at least one yet other power outlet 114C.

It should be understood that numerical values, notably voltage values, used to described functions of the electric distribution module 108 are not limitative. The electric distribution module 108 may for example include additional power converters adapted to provide electric power at different voltage values. The electric distribution module 108 may include additional output modules or other output modules instead of the output modules 406, 408, 410. The electric distribution module 108 may include additional power converters or other power converters instead of the power converter 404. For example, the third output module 410 may generate 36V DC electric power.

In this embodiment, the battery assembly 102 provides, in parallel to the electric distribution module 108, electric power to the mechanical distribution module 120. More specifically and with reference to FIG. 6, the high-voltage battery bank 302 electrically powers a motor control module 502 of the mechanical distribution module 120. The motor control module 502 is electrically connected to the electric motor 110 and includes inverters and/or controllers configured to adapt electric power received by the electric motor 110 from the high-voltage battery bank 302. The motor control module 502 is also communicably connected to the controller 200 to receive instructions therefrom and operate the electric motor 110 accordingly.

In the illustrated embodiment, the electric motor 110 is an AC electric double-ended shaft brushless motor. For example, the electric motor 110 may be a hyper 9 DHV Synchronous Reluctance Internal Permanent Magnet (SRIPM) motor that produces up to 85 kW of peak continuous power and 163 ft/lbs of peak power with a rotational speed of up to 8000 RPM. More specifically, the electric motor 110 includes a rotor operatively connected to the coupler 512 of the hydraulic distribution module 104 on one end, and to the coupler 522 of the pneumatic distribution module 106 on another end. In other words, rotation of the rotor of the electric motor 110 along a rotation axis causes concurrent actuation of the hydraulic pumps 514 of the hydraulic distribution module 104 and the pneumatic compressors 524 of the pneumatic distribution module 106.

As a result, the hydraulic pumps 514 may be actuated in response to a pneumatic implement requiring pneumatic power from the pneumatic distribution module 106, even if no implements are connected to the power outlets 114D of the hydraulic distribution module 104. Similarly, activation of the motor 110 in response to connection of a hydraulic implement causing activation of the hydraulic distribution module 104 in the present embodiment causes the pneumatic coupler 522 to be driven, even in the absence of pneumatic implements.

In some embodiments, the coupling modules 512, 522 may include a clutch or direct coupling to concurrently couple hydraulic pumps 514 and pneumatic compressor 524 to the electric motor 110. In this embodiment, the mechanical distribution module 120 does not include a transmission belt to transmit mechanical power from the electric motor 110 to the hydraulic distribution module 104 and the pneumatic distribution module 106, and direct coupling is provided by the coupling modules 512, 522 such that no transmission, Power take-off (PTO) or hydraulic mounted pump is required, thereby reducing a number of components of the mobile power system 100.

In some embodiments, the mobile power system 100 includes a plurality of electric motors (such as electric motor 110), each electric motor providing power to one of the distribution modules independently from the other distribution module. For example, the mobile power system 100 may include a first electric motor 110 and a second electric motor 110 receiving power from the battery assembly 102 in parallel, the first electric motor 110 powering components of the hydraulic distribution module 104, the second electric motor 110 powering components of the pneumatic distribution module 106.

In the hydraulic distribution module 104, the hydraulic pumps 514 further transmit generated hydraulic power to a control circuit 516 for distributing hydraulic power to one or more power outlets 114D (represented as a power outlet 114D for simplicity). For example, load sensors 116 corresponding to the one or more power outlets 114D are implemented in the control circuit 516 in this embodiment. The control circuit 516 further includes hydraulic accumulators for liquid leakage compensation, vibration and shock reduction, energy storage, or any other suitable purposes. Additionally, the hydraulic distribution module 104 may include a cooling system, a cooler reservoir, release and/or safety valves and filters.

In the pneumatic distribution module 106, the pneumatic compressors 524 further transmit generated pneumatic power to a control circuit 526 for distributing pneumatic power to one or more power outlets 114E (one power outlet 114E for the illustrated embodiment). A load sensor 116 corresponding to the power outlet 114E is implemented in the control circuit 526 in this embodiment. The control circuit 526 may further include pneumatic accumulators for fluid (e.g. air) leakage compensation, vibration and shock reduction, energy storage, or any other suitable purposes.

Additionally, the pneumatic distribution module 106 may include fluid filters to remove undesirable particles from air or any other fluid, an air condition unit, a heating unit (e.g. a resistive heater), heat exchangers, fans, and a control thermostat.

In this embodiment, the controller 200 causes the battery assembly 201 to enter the standby mode in response to a hydraulic pressure and/or a pneumatic pressure in the hydraulic distribution module 104 and the pneumatic distribution module 106 being above a hydraulic threshold and a pneumatic threshold respectively. For example, the hydraulic distribution module 104 may include a hydraulic pressure sensor (not shown) adapted to sense a hydraulic pressure generated by the hydraulic pump 514. Similarly, the pneumatic distribution module 106 may include a pneumatic pressure sensor (not shown) adapted to sense a pneumatic pressure generated by the pneumatic compressor 524. In this embodiment, both of the hydraulic pressure sensor and the pneumatic pressure sensor are communicably connected to the controller 200 such that, in response to said sensors indicating that the hydraulic pressure and the pneumatic pressure are above the hydraulic threshold and the pneumatic threshold respectively, the controller 200 causes the battery assembly to enter the standby mode. In use, accumulators of the control circuits 516, 526 may act as "buffers" to maintain unused generated hydraulic and pneumatic pressure in the hydraulic distribution module 104 and the pneumatic distribution module 106 respectively. In some embodiments, hydraulic and/or pneumatic implements may thus be operated utilizing the pressure accumulated within the corresponding module 104, 106, but with the battery assembly 201 and the motor 110 in the standby mode. Said entering of the standby mode by the battery assembly 102 may therefore facilitate reduction of noise emitted, in use, by the mobile power system 100.

In this embodiment, the hydraulic distribution module 104 includes an output valve (not shown) that is automatically or manually actuated from an open configuration to a closed configuration in response to no implement being connected to the power outlets of the hydraulic distribution module 104 and/or in response to implements connected thereto are not currently used (i.e. the implements does not currently require hydraulic power). In use, the output valve in the closed configuration prevents liquid from flowing from the hydraulic pump 514 to implements through the power outlets 114. Hydraulic pressure generated by the hydraulic pump 514 thus increases in the hydraulic distribution module 104 (e.g. accumulators thereof) due to the output valve being in the closed configuration. The hydraulic pressure may further reach the hydraulic threshold when no implement is connected to the power outlets 114 of the hydraulic distribution module 104, and/or when the output valve is in the closed configuration while one or more implements are connected to the hydraulic distribution module 104 without being currently used. This may lead the controller 200 to cause the battery assembly 102 to enter the standby mode, thereby causing the electric motor 110 to stop.

In this embodiment, components of the mechanical distribution module 120 are housed in a housing 122 for acoustic and heat insulation purposes, thereby reducing noise pollution of the mobile power system 100. The housing 122 includes louvers for circulating air therein. The housing 122 further includes doors to allow an operator to access components of the mechanical distribution module 120 (e.g. for assembly and maintenance thereof). The housing may be rated for exterior use (e.g. adequately sealed and protected against the elements) or indoor use based on an in-use application of the mobile power system 100. In this embodiment, the housing 122 further includes dampening foot mounts (not shown) or other dampening systems to minimize vibration transmission from components of the mechanical distribution module 120 to an exterior of the housing 122. In some embodiments, other components of the mobile power system 100 such as the electric distribution module 108 and/or the battery assembly 102 may be also housed in the housing 122 or in another housing similar to housing 122.

Figure 7:
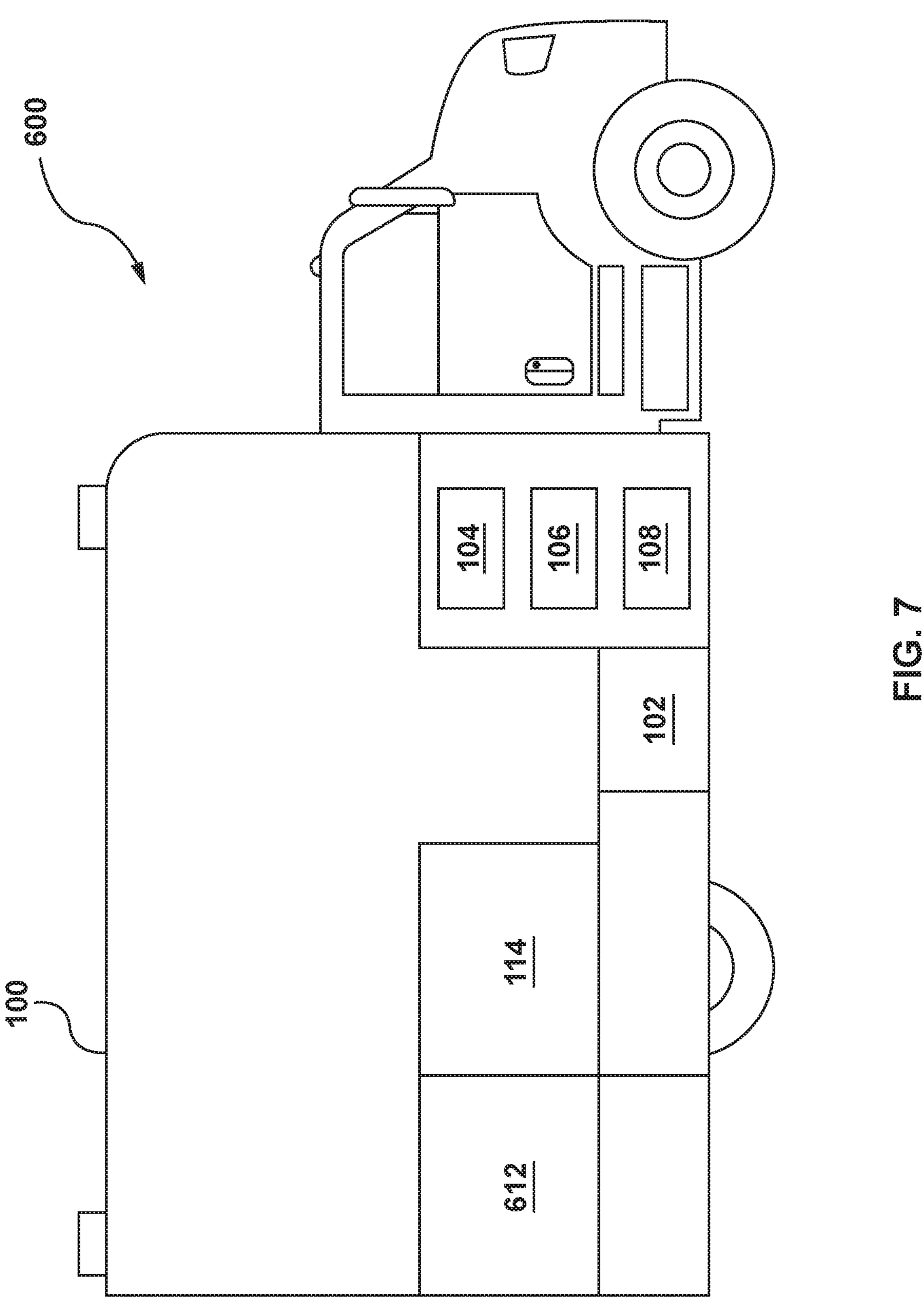
FIG. 7 is a high-level diagram of a service vehicle on which the mobile power system of FIG. 1 is mounted in accordance with some embodiments of the present technology.

With reference to FIG. 7, the mobile power system 100 is mounted in a service vehicle 600. The service vehicle 600 may be any vehicle suitable to carry the mobile power system 100 to a desired location such as a remote worksite. For example and without limitations, the service vehicle 600 may be construction truck, an autonomous mobile robot, a van, a medium duty truck, a heavy duty truck or a pick-up truck. More specifically, the battery assembly 102, the distribution modules 104, 106 and 108 are mounted in the service vehicle 600 and may be, for example, accessed from an interior of the service vehicle 600. In the illustrative embodiment of FIG. 7, a control interface 612 similar to the control interface 610 is accessible by a user from an exterior of the service vehicle 600. With reference to FIGS. 1 and 7, the power outlets 114 are accessible from an exterior of the trailer 50 and the service vehicle 600 through panels (or shutters) that may be selectively open or closed.

In one embodiment, the mobile power system 100 may be electrically connected to a second mobile power system that may be, for example, mounted on another service vehicle. The control module 610 may further direct electric power from a battery assembly of the second mobile power system to the power outlets 114. In other words, two mobile power systems 100 may be inter-connected to increase an amount of electric power that may be provided to the power outlets 114 of one of the two mobile power systems 100. Alternatively or additionally, the mobile power system 100 may include, in other embodiments, an additional battery assembly that may be similar to the battery assembly or include one or more components thereof. For example, the additional battery assembly may include a high voltage battery bank, one or more power outlets for delivering 240V AC electric current and/or 120V AC electric current. The additional battery assembly may be mounted on a trailer operatively connected to the service vehicle 600 or to the trailer 50 or mounted on an independent service vehicle that may reach the work site. Said additional battery assembly may thus provide redundancy and/or extend an autonomy (i.e. battery life) of the mobile power system 100.

It is to be understood that the operations and functionality of the described mobile power system 100, its constituent components, and associated processes may be achieved by any one or more of hardware-based, software-based, and firmware-based elements. Such operational alternatives do not, in any way, limit the scope of the present disclosure.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A mobile power system for powering a plurality of implements, the mobile power system comprising:

a controller;

a battery assembly communicably connected to the controller;

a plurality of distribution modules communicably connected to the controller and electrically connected to the battery assembly, the plurality of distribution modules being configured to selectively provide power to at least one corresponding implement of the plurality of implements, each distribution module comprising at least one power outlet for connecting the at least one corresponding implement, the plurality of distribution modules comprising:

an electric distribution module configured to distribute electric power from the battery assembly to at least one electric implement of the plurality of implements connected thereto;

a hydraulic distribution module configured to convert electric power from the battery assembly into hydraulic power and distribute said hydraulic power to at least one hydraulic implement of the plurality of implements connected thereto; and a pneumatic distribution module configured to convert electric power from the battery assembly into pneumatic power and distribute said pneumatic power to at least one pneumatic implement of the plurality of implements connected thereto; and at least one load sensor communicably connected to the controller and respectively disposed at the at least one power outlet to detect presence of one implement connected at the at least one power outlet, the at least one load sensor being configured to sense power consumption at each power outlet and generate data comprising information about said power consumption; and the data is stored in a memory communicably connected to the controller.

2. The mobile power system of claim 1, further comprising an electric motor communicably connected to the controller and powered by the battery assembly, and wherein at least one of the distribution modules uses the electric motor to convert received electric power.

3. The mobile power system of claim 2, wherein the hydraulic distribution module and the pneumatic distribution module receive mechanical power from the electric motor.

4. The mobile power system of claim 2, wherein:

the hydraulic distribution module comprises a hydraulic pump operatively connected to the electric motor;

the hydraulic pump is configured to receive mechanical power from the electric motor during operation;

the pneumatic distribution module comprises a pneumatic compressor operatively connected to the electric motor;

the pneumatic compressor is configured to receive mechanical power from the electric motor during operation.

5. The mobile power system of claim 4, wherein the electric motor is a double-ended shaft brushless motor comprising a rotor, rotation of the rotor along a rotation axis causing concurrent actuation of the hydraulic pump and the pneumatic compressor.

6. The mobile power system of claim 2, wherein:

the battery assembly is a DC battery assembly configured to generate a DC electric current;

the mobile power system comprises a DC-AC power inverter electrically connected to the battery assembly; and the electric motor is a tri-phase electric motor receiving tri-phase electric power from the DC-AC power inverter.

7. The mobile power system of claim 1, wherein:

the mobile power system is mounted on a service vehicle; and the service vehicle includes one of a construction truck, an autonomous mobile robot, a service trailer, a van, a medium duty truck, a heavy duty truck and a pick-up truck.

8. The mobile power system of claim 1, wherein:

the mobile power system is mounted on a service vehicle;

the service vehicle is an electric service vehicle comprising a vehicle operation-dedicated battery; and the mobile power system further comprises:

an adapting device configured to provide electric power from the vehicle operation-dedicated battery to the plurality of distribution modules such that the plurality of distribution modules receives electric power from the vehicle operation-dedicated battery.

9. The mobile power system of claim 1, wherein the controller is configured to adapt a transfer of electric power from the battery assembly to the plurality of distribution modules based on data provided by the at least one load sensor.

10. The mobile power system of claim 1, wherein:

the at least one load sensor is a plurality of load sensors, the plurality of load sensors being disposed at each of the at least one power outlet; and the controller is further configured to, in response to the plurality of load sensors indicating that no implement is connected to the at least one power outlet:

trigger a counter indicative of an amount of time that has passed since the detection that no implement is connected to the at least one power outlet; and disconnect, in response to the counter reaching a predetermined value, the battery assembly from the plurality of distribution modules.

11. The mobile power system of claim 1, wherein:

the at least one load sensor is a plurality of load sensors, the plurality of load sensors being disposed at each of the at least one power outlet; and the controller is further configured to:

cause the battery assembly to enter a standby mode, in response to at least one of:

the plurality of load sensors indicating that no implement is connected to the at least one power outlet, and at least one of the plurality of implements connected to the at least one power outlet is not currently used.

12. A mobile power system for powering a plurality of implements, the mobile power system comprising:

a controller:

a battery assembly communicably connected to the controller;

a plurality of distribution modules communicably connected to the controller and electrically connected to the battery assembly, the plurality of distribution modules being configured to selectively provide power to at least one corresponding implement of the plurality of implements, each distribution module comprising at least one power outlet for connecting the at least one corresponding implement, the plurality of distribution modules comprising:

an electric distribution module configured to distribute electric power from the battery assembly to at least one electric implement of the plurality of implements connected thereto;

a hydraulic distribution module configured to convert electric power from the battery assembly into hydraulic power and distribute said hydraulic power to at least one hydraulic implement of the plurality of implements connected thereto; and a pneumatic distribution module configured to convert electric power from the battery assembly into pneumatic power and distribute said pneumatic power to at least one pneumatic implement of the plurality of implements connected thereto;

at least one load sensor communicably connected to the controller and respectively disposed at the at least one power outlet to detect presence of one implement connected at the at least one power outlet; and an electric motor communicably connected to the controller and powered by the battery assembly, the hydraulic distribution module and the pneumatic distribution module receiving mechanical power from the electric motor, the controller being further configured to, in order to cause the battery assembly to enter a standby mode, cause the electric motor to stop.

13. A mobile power system for powering a plurality of implements, the mobile power system comprising:

a controller:

a first battery assembly communicably connected to the controller;

a plurality of first distribution modules communicably connected to the controller and electrically connected to the first battery assembly, the plurality of first distribution modules being configured to selectively provide power to at least one corresponding implement of the plurality of implements, each distribution module comprising at least one power outlet for connecting the corresponding at least one implement, the plurality of first distribution modules comprising:

a first electric distribution module configured to distribute electric power from the first battery assembly to at least one electric implement of the plurality of implements connected thereto;

a first hydraulic distribution module configured to convert electric power from the first battery assembly into hydraulic power and distribute said hydraulic power to at least one hydraulic implement of the plurality of implements connected thereto; and a first pneumatic distribution module configured to convert electric power from the first battery assembly into pneumatic power and distribute said pneumatic power to at least one pneumatic implement of the plurality of implements connected thereto; and at least one load sensor communicably connected to the controller and respectively disposed at the at least one power outlet to detect presence of one implement connected at the at least one power outlet;

a second battery assembly communicably connected to the controller; and a plurality of second distribution modules communicably connected to the controller and electrically connected to the second battery assembly, the plurality of second distribution modules being configured to selectively provide power to at least one second corresponding implement of the plurality of implements, the plurality of second distribution modules comprising:

a second electric distribution module configured to distribute electric power from the second battery assembly to at least one corresponding implement connected thereto;

a second hydraulic distribution module configured to convert electric power from the second battery assembly into hydraulic power and distribute said hydraulic power to at least one corresponding implement connected thereto; and a second pneumatic distribution module configured to convert electric power from the second battery assembly into pneumatic power and distribute said pneumatic power to at least one corresponding implement connected thereto.

14. The mobile power system of claim 13, wherein the controller is configured to direct electric power from the second battery assembly to the plurality of first distribution modules.

15. The mobile power system of claim 1, wherein the electric distribution module comprises at least one converter to provide electric power to at least one corresponding implement connected thereto with at least one corresponding voltage values.

16. The mobile power system of claim 1, wherein:

the hydraulic distribution module and the pneumatic distribution module are housed in a same mechanical distribution module; and the mechanical distribution module comprises an acoustic and heat insulated housing.

17. The mobile power system of claim 1, wherein the electric distribution module comprises:

a first power outlet for delivery of DC electric current;

a second power outlet for delivery of 240V AC electric current; and a third power outlet for delivery of 120V AC electric current.

18. The mobile power system of claim 17, wherein the first power outlet comprises:

a first DC power outlet for delivery of 12V DC electric current;

a second DC power outlet for delivery of 24V DC electric current; and a third DC power outlet for delivery of 48V DC electric current.

* * * * *